US010438192B2

(12) United States Patent
Goodrich

(10) Patent No.: US 10,438,192 B2
(45) Date of Patent: Oct. 8, 2019

(54) SYSTEM AND PROCESS FOR CONDUCTING MULTIPLE TRANSACTIONS WITH A SINGLE CARD

(71) Applicant: TracFone Wireless, Inc., Miami, FL (US)

(72) Inventor: Stephanie Goodrich, Miami, FL (US)

(73) Assignee: TracFone Wireless, Inc., Miami, FL (US)

(*) Notice: Subject to any disclaimer, the term of this patent is extended or adjusted under 35 U.S.C. 154(b) by 0 days.

(21) Appl. No.: 14/218,286

(22) Filed: Mar. 18, 2014

(65) Prior Publication Data
US 2014/0279478 A1 Sep. 18, 2014

Related U.S. Application Data

(60) Provisional application No. 61/794,836, filed on Mar. 15, 2013.

(51) Int. Cl.
G06Q 20/34 (2012.01)
G06Q 20/20 (2012.01)
G06Q 20/28 (2012.01)
H04M 17/02 (2006.01)
H04M 17/00 (2006.01)

(52) U.S. Cl.
CPC ......... *G06Q 20/342* (2013.01); *G06Q 20/204* (2013.01); *G06Q 20/28* (2013.01); *G06Q 20/3572* (2013.01); *H04M 17/02* (2013.01); *H04M 17/106* (2013.01)

(58) Field of Classification Search
USPC .......................... 235/380; 455/406; 710/301
See application file for complete search history.

(56) References Cited

U.S. PATENT DOCUMENTS

| 5,988,509 | A  | * | 11/1999 | Taskett | G06Q 20/3433 235/379 |
| 6,000,608 | A  | * | 12/1999 | Dorf | G06Q 20/341 235/375 |
| 6,256,690 | B1 | * | 7/2001 | Carper | 710/301 |
| 6,463,139 | B1 | * | 10/2002 | Davitt | H04M 15/765 379/114.16 |
| 6,494,367 | B1 | * | 12/2002 | Zacharias | G06Q 20/04 235/379 |
| 7,546,947 | B1 | * | 6/2009 | Arias | G06Q 20/04 235/380 |
| 2002/0174016 | A1 | * | 11/2002 | Cuervo | G06Q 20/00 705/16 |

(Continued)

FOREIGN PATENT DOCUMENTS

WO    WO-0155955 A1 *  1/2001 ............... G06K 5/00

OTHER PUBLICATIONS

"Wow! Card Services", MediaNet Press Release Wire, Australian Associated Press Pty Limited, ProQuest ID 455305604 dated Sep. 15, 2005.*

*Primary Examiner* — Alexander G Kalinowski
*Assistant Examiner* — Blane A Lickteig
(74) *Attorney, Agent, or Firm* — BakerHostetler

(57) ABSTRACT

A transaction system and process includes providing financial transactions based on a single card. The transaction system and process further including providing prepaid wireless service based on the single card and providing long-distance service based on the single card.

2 Claims, 5 Drawing Sheets

(56) References Cited

U.S. PATENT DOCUMENTS

| | | | | |
|---|---|---|---|---|
| 2003/0015589 A1* | 1/2003 | Jimenez | ................ | G06Q 20/28 235/493 |
| 2003/0037000 A1* | 2/2003 | Fieldhouse | ........ | G06Q 20/1085 705/43 |
| 2003/0187787 A1* | 10/2003 | Freund | .................. | G06Q 20/10 705/39 |
| 2003/0194988 A1* | 10/2003 | Knox | ...................... | H04L 12/66 455/406 |
| 2009/0192904 A1* | 7/2009 | Patterson | ............... | G06Q 20/20 705/17 |
| 2012/0101882 A1* | 4/2012 | Todd | ................... | G06Q 20/202 705/14.17 |

* cited by examiner

SYSTEM AND PROCESS FOR CONDUCTING MULTIPLE TRANSACTIONS WITH A SINGLE CARD

CROSS-REFERENCE TO RELATED APPLICATIONS

This application claims the benefit from U.S. Provisional Application No. 61/794,836 filed on Mar. 15, 2013, which is hereby incorporated by reference in its entirety for all purposes as if fully set forth herein.

FIELD OF THE DISCLOSURE

The disclosure is related generally to a transaction system and, more particularly, to a transaction system and process for conducting commercial transactions using a single common transaction card.

BACKGROUND OF THE DISCLOSURE

An increasingly large number of transaction cards have become available to consumers for conducting various transactions. A transaction card may be used to effectuate payment in a transaction or obtain a service. Various transaction card issuers, such as credit card companies, banks, retailers, prepaid wireless service providers, long distance telephone service providers and vendors may frequently provide consumers with these various transaction cards. For example, consumers may have a variety of transaction cards, for example, credit cards, debit cards, smart cards, prepaid wireless service cards, long distance telephone service cards and/or any other transaction cards that may be used to complete a transaction to purchase products, obtain services, or the like.

Oftentimes, users must carry a card for conducting various financial transactions, another card for obtaining prepaid wireless service, another card for obtaining long distance service, and so on. The numerous transaction cards make it difficult for a consumer to be able to manage the various stored values associated with each of the cards including ensuring that each transaction card has a sufficient value for the product or service to be obtained, and so on. Moreover, it becomes difficult for the consumer to use the various cards efficiently as the various values are not transferable between various entities that issue the cards.

Thus, a system and process for conducting multiple transactions utilizing a single common card for the consumer is needed.

SUMMARY OF THE DISCLOSURE

The foregoing needs are met, to a great extent, by the disclosure, with a process and system for providing a consumer with a single card that may be used to obtain a number of different products and obtain a number of different services.

In accordance with other aspects of this particular embodiment, a transaction system includes a system that is configured to provide financial transactions based on a single card, the system is further configured to provide prepaid wireless service based on the single card, and the system is further configured to provide long-distance service based on the single card.

In accordance with further aspects of this particular embodiment, a transaction process includes providing financial transactions based on a single card, providing prepaid wireless service based on the single card, and providing long-distance service based on the single card.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

In order to facilitate a fuller understanding of the disclosure, reference is now made to the accompanying drawings, in which like elements are referenced with like numerals. These drawings should not be construed as limiting the disclosure, but are intended to be illustrative only.

DETAILED DESCRIPTION OF EMBODIMENTS

A multiple transaction system and process may aggregate account information to allow a consumer to conduct multiple transactions with a single common transaction card. The aggregate account information may include debit account information, prepaid wireless service information, long-distance telephone service information, and the like.

The transaction system may communicate with various systems hosted by various entities to complete the purchase of or otherwise obtain products or services utilizing the single common transaction card. For example, the transaction system may communicate with a transaction server and a financial server via a communication network to complete the transaction to obtain products or services. The transaction system and process may further communicate with a prepaid wireless service provider and allow the consumer to obtain, authorize, or add prepaid wireless service using the single common transaction card. Moreover, the transaction system and process may further allow the consumer to obtain long-distance telephone service utilizing the single common transaction card.

Figure 1:
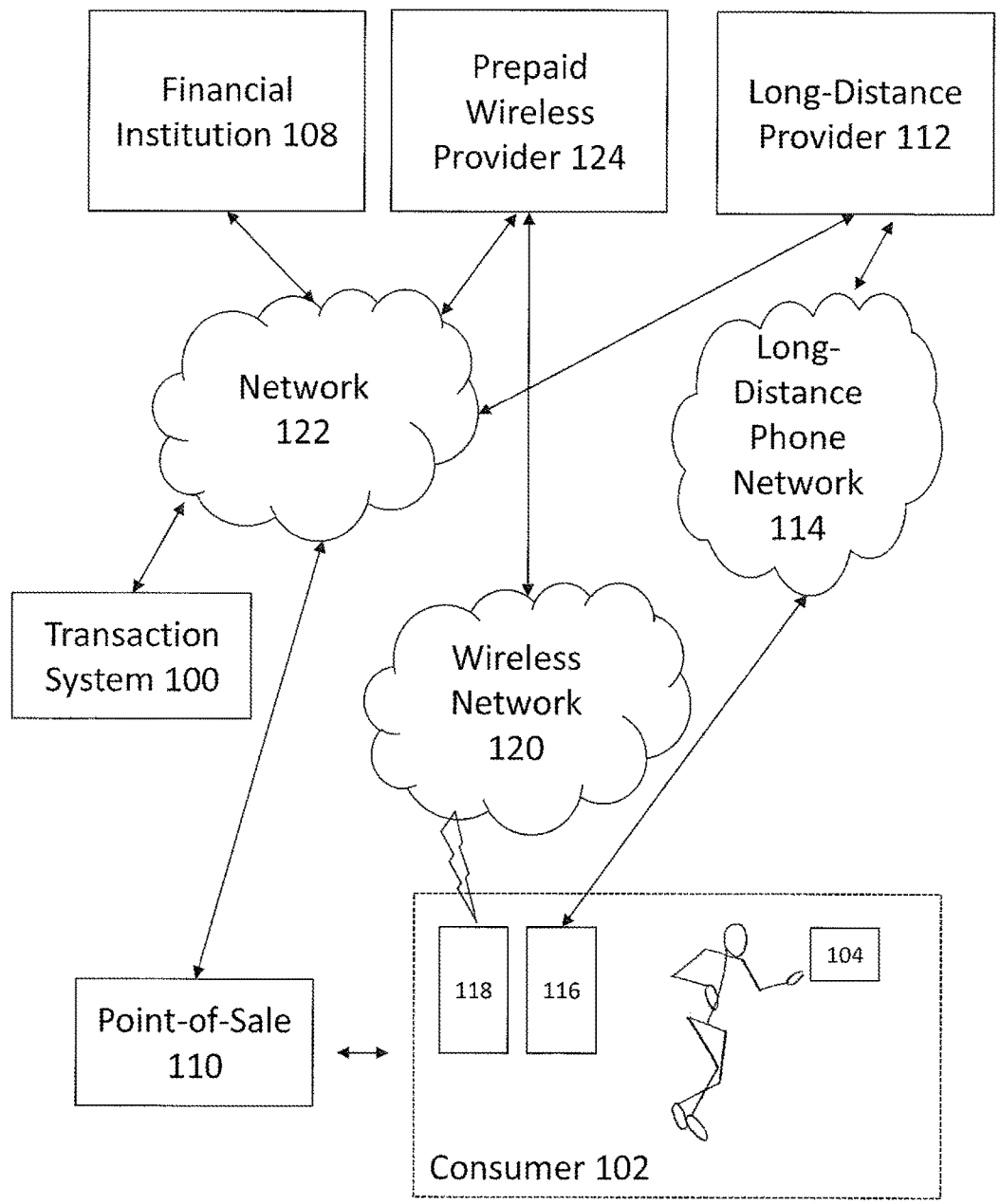
FIG. 1 shows a transaction system constructed in accordance with an aspect of the disclosure together with a number of other systems interacting with the transaction system.

FIG. 1 shows a transaction system constructed in accordance with an aspect of the disclosure together with a number of other systems interacting with the transaction system. Referring to FIG. 1, there is shown a transaction system 100 in accordance with an aspect of the disclosure. The transaction system 100 may allow a consumer 102 to conduct financial transactions with a single common transaction card 104 with a financial institution 108 at a point-of-sale (POS) terminal 110, over the Internet, or the like, such as communication network 122 and may include any other components necessary to complete a purchase. FIG. 1 further shows the transaction system 100 allowing a consumer 102 to obtain long-distance telephone service from a long distance telephone service provider 112 over a telephone network 114 with a telephone 116 utilizing the single common transaction card 104. Finally, FIG. 1 shows the transaction system 100 allowing the consumer 102 to obtain prepaid wireless service from a prepaid wireless service provider 124 for their wireless device 118 over a wireless network 120 utilizing the single common transaction card 104. The single common transaction card 104 and transaction system 100 may provide additional services and products utilizing other service providers, financial institutions, and the like.

Although the transaction system 100 is shown as a single component in FIG. 1, the transaction system 100 may also be alternatively located entirely or partially on one or more secondary systems separate from the transaction system 100. This secondary system may include a database, server, or the like that connects to the communication network 122 and provides the functionality described herein.

The wireless device 118 may include, for example, a mobile phone, a smart phone, a computer, a personal computer, a laptop, a cellular communication device, a workstation, a mobile device, a phone, a television, a handheld PC, a personal digital assistant (PDA), a network appliance, an Internet accessible device, netbook, tablet computer, or any other device that may be in communication over the wireless network 120.

The communication network 122 may couple the transaction system 100, the financial institution 108 and the point-of-sale (POS) terminal 110. The communication network 122 may be a wireless network, a wired network or any combination of wireless network and wired network. For example, the communication network 122 may include one or more of a fiber optic network, a passive optical network, a cable network, an Internet network, a satellite network (e.g., operating in Band C, Band Ku or Band Ka), a wireless LAN, a Global System for Mobile Communication (GSM), a Personal Communication Service (PCS), a long term evolution (LTE) network, a CDMA (Code-Division Multiple Access) network, W-CDMA (Wideband Code-Division Multiple Access) network, a Personal Area Network (PAN), D-AMPS, Wi-Fi, Fixed Wireless Data, IEEE 802.11a, 802.11b, 802.15.1, 802.11n and 802.11g network or any other wired or wireless network for transmitting and receiving a data signal. In addition, the communication network 122 may include, without limitation, telephone lines, fiber optics, IEEE Ethernet 802.3 channels, wide area network (WAN) channels, local area network (LAN), or global network aspects such as the Internet. The communication network 122 may support an Internet network, a wireless communication network, a cellular network, or the like, or any combination thereof.

The communication network 122 may further include one, or any number of the exemplary types of networks mentioned above operating as a stand-alone network or in cooperation with each other. Although the communication network 122 is depicted as one network, it should be appreciated that according to one or more embodiments, the communication network 122 may include a plurality of interconnected networks, such as, for example, a service provider network, the Internet, a broadcaster's network, a cable television network, corporate networks, home networks and the like.

The transaction system 100 may include one or more servers. For example, the transaction system 100 may include a UNIX based server, Windows 2000 Server, Microsoft IIS server, Apache HTTP server, API server, Java server, Java Servlet API server, ASP server, PHP server, HTTP server, Mac OS X server, Oracle server, IP server, other independent server or the like to support operations of a client. Also, the transaction system 100 may include one or more of an Internet Protocol (IP) network server or public switch telephone network (PSTN) server. The transaction system 100 may include one or more databases for storing a network model topology, network policies based at least in part on the network model topology, and/or the like.

The financial institution 108 may include one or more servers to communicate financial information to the point-of-sale (POS) 110 and/or transaction system 100 via the communication network 122. For example, the financial institution 108 may include a UNIX based server, Windows 2000 Server, Microsoft IIS server, Apache HTTP server, API server, Java server, Java Servlet API server, ASP server, PHP server, HTTP server, Mac OS X server, Oracle server, IP server, other independent server or the like to provide financial information to the point-of-sale (POS) terminal 110. Also, the financial institution 108 may include one or more of an Internet Protocol (IP) network server, public switch telephone network (PSTN) server, or the like.

The financial institution 108 may include one or more memory storage devices including, without limitation, paper card storage, punched card, tape storage, paper tape, magnetic tape, disk storage, gramophone record, floppy disk, hard disk, ZIP disk, holographic, molecular memory or the like. The one or more storage devices may also include, without limitation, optical disc, CD-ROM, CD-R, CD-RW, DVD, DVD-R, DVD-RW, DVD+R, DVD+RW, DVD-RAM, Blu-ray, Minidisc, HVD, Phase-change Dual storage device and the like. The one or more storage devices may further include, without limitation, magnetic bubble memory, magnetic drum, core memory, core rope memory, thin film memory, twistor memory, flash memory, memory card, semiconductor memory, solid state semiconductor memory or any other like mobile storage devices.

The point-of-sale (POS) terminal 110 may include a scanner, a reader, a cash register, transceiver devices, and/or other detection devices that may identify products or services. For example, the scanners or the readers at the point-of-sale (POS) terminal 110 may include a near field communications (NFC) device, barcode reader, radio-frequency identification (RFID) detector, infrared detector, Bluetooth detector, laser scanner, cameras, near-field communication devices, image scanner, and/or other detection devices that may identify products or services. The point-of-sale (POS) terminal 110 may also include a mobile user device, a computer, a personal computer, a laptop, a cellular communication device, a workstation, a mobile device, a personal digital assistant (PDA), a thin system, a fat system, a network appliance, an Internet accessible device, netbook, tablet computer, or other any other device. The transaction system 100 and the financial institution 108. The point-of-sale (POS) terminal 110 may further include one or more intermediary devices that may communicate with the communication network 122, such as a transmitter/receiver, router, modem, a transceiver or the like. The point-of-sale (POS) terminal 110 may be coupled to the transaction system 100 and the financial institution 108 via a wired link. In another example, the point-of-sale (POS) terminal 110 may be coupled to the transaction system 100 and the financial institution 108 via a wireless link or a combination of a wired link and a wireless link.

Figure 2:
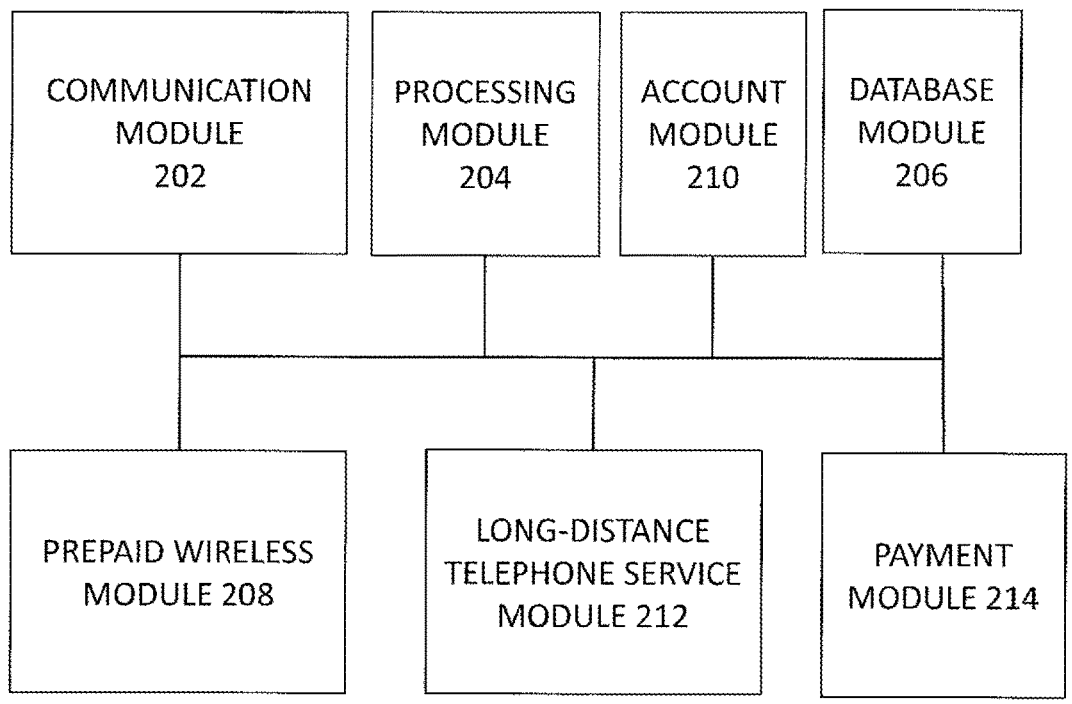
FIG. 2 is a block diagram components of the transaction system.

FIG. 2 is a block diagram of components of the transaction system 100. The transaction system 100 may include a communication module 202, a processing module 204, a database module 206, a prepaid wireless module 208, an account module 210, a long-distance telephone service module 212, and a payment method module 214. It is noted that modules 202-214 are exemplary and the functions performed by one or more of the modules may be combined with that performed by other modules. The functions described herein as being performed by modules 202-214 also may be separated and may be located or performed by other modules.

The communication module 202 may include transceivers and a computer processor to establish a communication path with one or more of the transaction system 100, the financial institution 108, the prepaid wireless service provider 124, the long distance telephone provider 112 and the like via the communication network 122. For example, the communication module 202 may include a user interface (e.g., a graphical user interface (GUI), an application programming interface (API)) or the like to transmit information between one or more of the transaction system 100, the financial institution 108, the prepaid wireless service provider 124, the long-distance telephone service provider 112 and the like. For example, the communication module 202 may include a separate or unified graphical user interface to communicate with the consumer 102. In another example, the communication module 202 may include an application programming interface (API) or the like to communicate with one or more of the transaction system 100, the financial institution 108, the prepaid wireless service provider 124, the long-distance telephone provider 112 and the like. The communication module 202 may be communicatively coupled to other modules of the transaction system 100. For example, the communication module 202 may receive information from the consumer 102, the transaction system 100, the financial institution 108, the prepaid wireless service provider 124, and the long-distance telephone provider 112 and provide the information to other modules of the transaction system 100.

The processing module 204 may access various modules to complete the process of purchasing or otherwise obtaining products or services. The processing module 204 may include one or more computer processors and databases to access information from various modules of the transaction system 100. For example, the processing module 204 may access the database module 206, the prepaid wireless module 208, the account module 210, the long distance telephone service module 212, and/or payment module 214 to purchase or otherwise obtain products or services (transaction).

For example, the processing module 204 may access account module 210 to obtain account information associated with the transaction. The processing module 204 may access the transaction information stored at the point-of-sale 110 via the communication module 202. The processing module 204 may communicate with the transaction system 100 and/or the financial institution 108 in order to obtain authorization to complete the transaction. The processing module 204 may authorize a transaction when it is determined that the single common transaction card 104 is authorized to purchase the products or services. The communication module 202 may provide an approval message to the point-of-sale 110 to approve the transaction. Also, the transaction system 100 and/or the financial institution 108 may provide the approval message to the point-of-sale 110.

Once the processing module 204 approves a transaction, the processing module 204 may record the transaction database module 26.

The database module 206 may store transaction information of the consumer 102. The database module 206 may include or use a computer processor and a physical memory database to store the transaction information of the consumer 102.

The prepaid wireless module 208 may communicate with the prepaid wireless provider 124 and/or the transaction system 100 directly or through the communication module 202. The prepaid wireless module 208 ensures that transactions involving prepaid wireless service using the common transaction card 104 are properly completed.

The account module 210 may store account information of the consumer 102. The account module 210 may include or use a computer processor and a physical memory database to store the account information of the consumer 102. For example, the account module 210 may store account information and may include a credit card, debit card, pre-paid cards, a gift card, membership cards, a stored-value card, a smart card, a refund card, a government card, a coupon, a reward, a voucher, an electronic mail, a scan code, prepaid wireless phone information, long-distance telephone provider information and/or the like that may be used to complete a transaction to purchase products or services. The account information may include one or more of identification number, expiration date, security number, name, address, phone number, electronic mail address, website address, income, spending habits, age and/or other information of a consumer.

The account information stored in the account module 210 may be updated periodically. For example, the account information may be updated daily, weekly, monthly, quarterly, seasonally, yearly and/or other predetermined period of time. The account module 210 may communicate with the transaction system 100 and/or the financial institution 108 directly or via the communication module 202. The transaction system 100 and/or the financial institution 108 may provide updated account information of various accounts of the consumer to the account module 210.

The long-distance telephone service module 212 may communicate with the long-distance provider 112 and/or the transaction system 100 to ensure that when the consumer 102 uses the common transaction card platform for to obtain long-distance service, the transaction is properly completed.

The payment module 214 may determine transaction information for the purchase of products or services. The transaction information may include one or more of a date, price, description, size, universal price code (UPC), size, expiration date, merchant, location and other information to complete the purchase of products or services.

Figure 3:
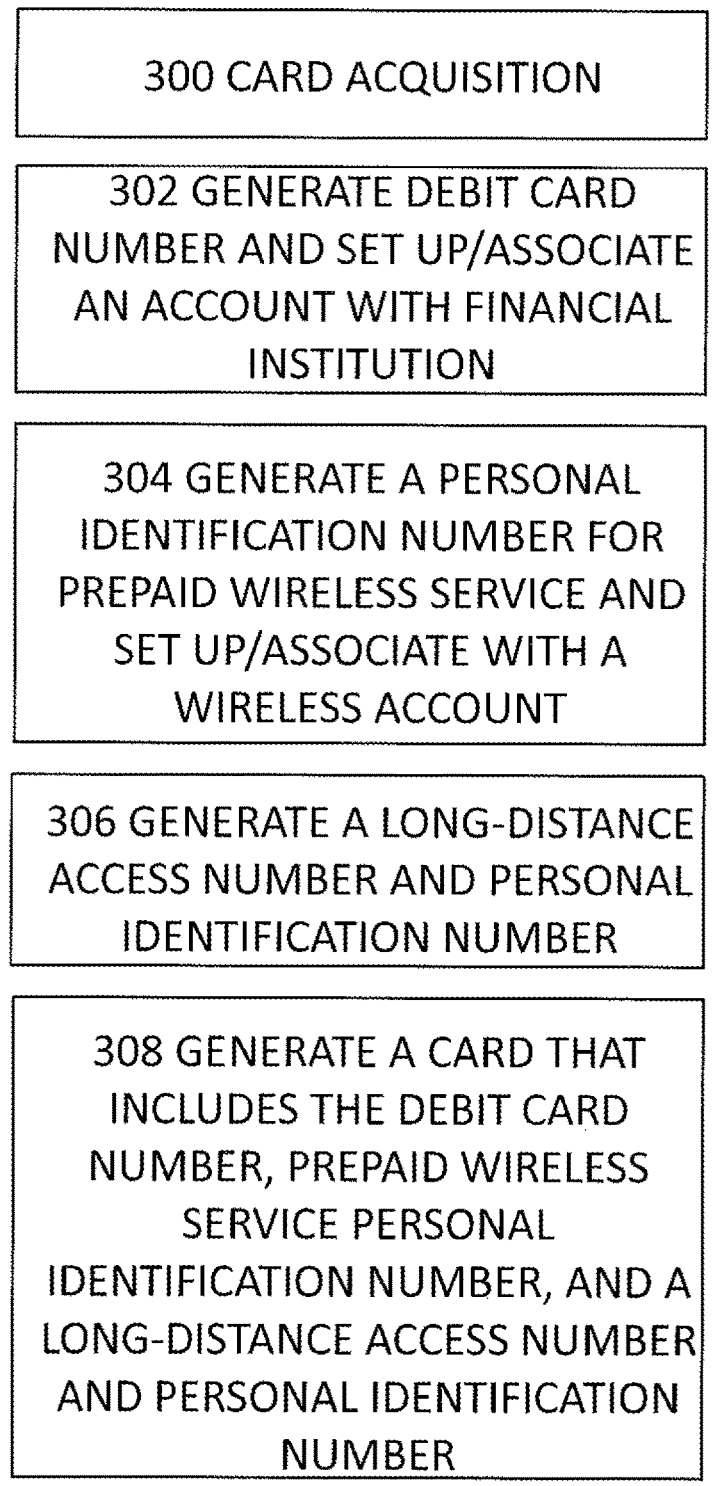
FIG. 3 shows a process illustrating card acquisition in conjunction with the multiple transaction system according to an aspect of the disclosure.

FIG. 3 shows a process illustrating the card acquisition for the multiple transaction system according to an aspect of the disclosure. This exemplary method 300 may be provided by way of example, as there are a variety of ways to carry out the method. The method 300 shown in FIG. 3 can be executed or otherwise performed by one or a combination of various systems. The method 300 is described below may be carried out by the systems, networks, and/or modules shown in FIGS. 1 and 2, by way of example, and various elements of the systems, networks, and/or modules are referenced in explaining the example method of FIG. 3. Each block shown in FIG. 3 represents one or more processes, methods or subroutines carried out in exemplary method 300. Referring to FIG. 3, exemplary method 300 may begin at step 302.

In process 302, the transaction system 100 and/or the financial institution 108 may generate a debit card number and set up and/or associate an account with the financial institution 108. Additionally, any other actions necessary to enable the debit card capability of the common transaction card 104 are implemented in process 302. Accordingly, after process 302, the common transaction card 104 may be used to complete debit card transactions.

In process 304, the transaction system 100 and/or the prepaid wireless provider 124 may generate a personal identification number for prepaid wireless service and set up and/or associate with a wireless account. Additionally, any other actions necessary to enable obtain, adding, and/or authorizing prepaid wireless service are implemented in process 304. Thereafter, the consumer 102 may use the common transaction card 104 to obtain, add, and/or authorize prepaid wireless service associated with the wireless device 118 associated with the prepaid wireless provider 124.

Next, in process 306 the transaction system 100 and/or the long-distance provider 112 may generate a long-distance access number, personal identification number, and/or the like. Additionally, any other actions necessary to obtain long-distance service are implemented in process. 6. Thereafter, the consumer 102 may use the common transaction card 104 to obtain long distance telephone service using the common transaction card 104.

Finally, in process 308 a card is generated that includes the debit card number, the prepaid wireless service personal identification number, and the long-distance access number and personal identification number. An exemplary common transaction card 104 is shown in FIG. 5.

Figure 4:
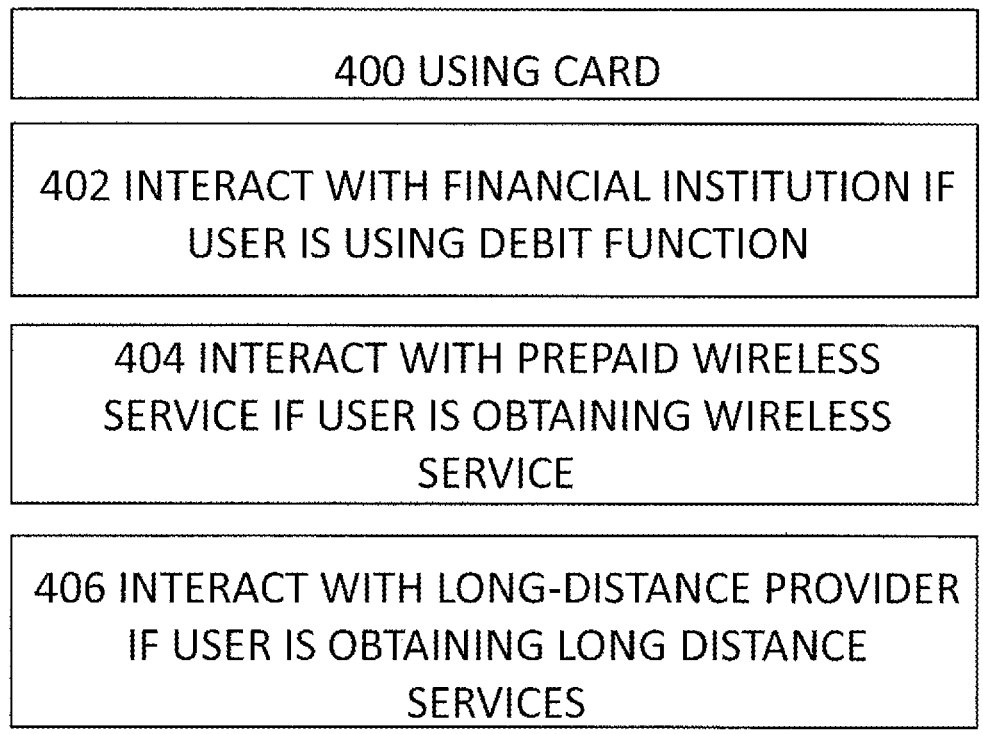
FIG. 4 shows a process illustrating card usage in conjunction with the multiple transaction system according to an aspect of the disclosure.

FIG. 4 shows a process illustrating the card usage for the multiple transaction system according to an aspect of the disclosure. This exemplary method 400 may be provided by way of example, as there are a variety of ways to carry out the method. The process 400 shown in FIG. 4 can be executed or otherwise performed by one or a combination of various systems. The process 400 is described below may be carried out by the systems, networks, and/or modules shown in FIGS. 1 and 2, by way of example, and various elements of the systems and networks are referenced in explaining the example process of FIG. 4. Each block shown in FIG. 4 represents one or more processes, methods or subroutines carried out in exemplary method 400. Referring to FIG. 4, exemplary process 400 may begin at step 402. In step 402, when the user is using the debit function, the user will interact with a financial institution as is known in the art. In step 404, if the user is obtaining prepaid wireless service, the user may interact with the prepaid wireless service as is known in the art. Finally, if the user is obtaining long-distance service, the user interacts with a long distance service provider as is known in the art.

Figure 5:
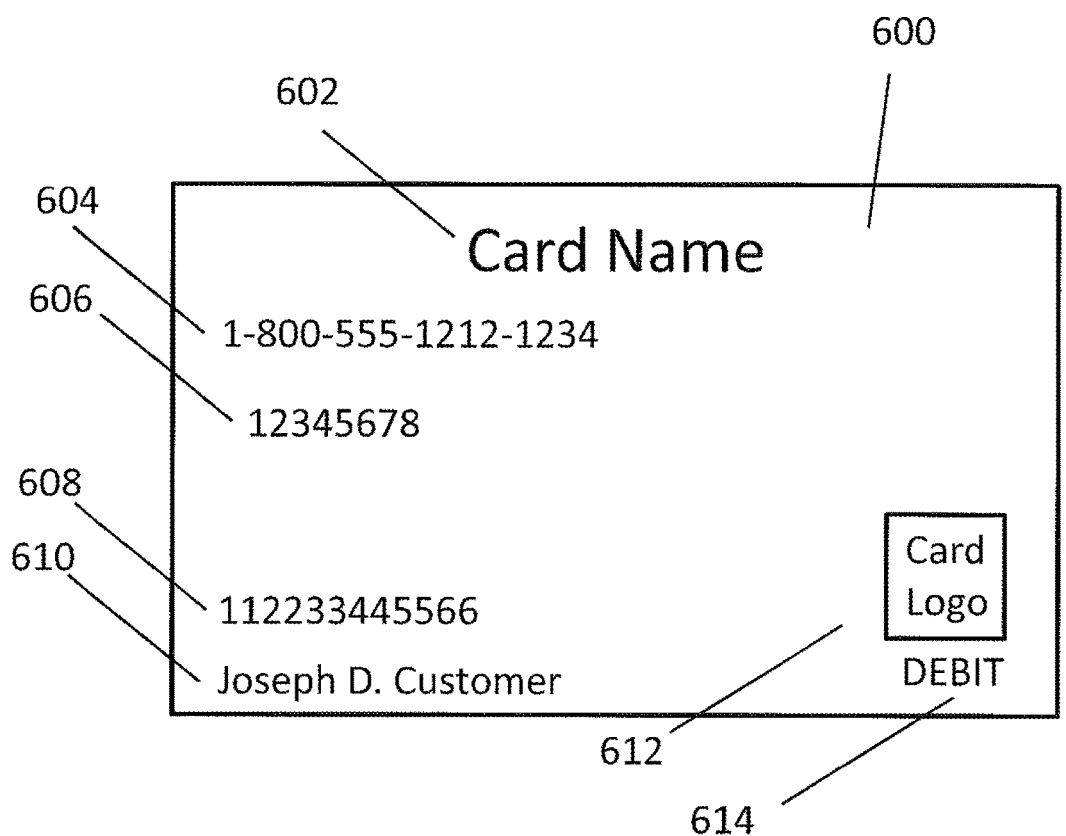
FIG. 5 shows a card usable with the system and process to conduct multiple transactions in accordance with the disclosure.

FIG. 5 shows a card usable with the system and process to conduct multiple transactions in accordance with the disclosure. FIG. 5 shows a card 600 having a card name 602, a long-distance access number and personal identification number 604, a prepaid wireless access code 606, a debit or credit card number 608, the consumer name 610, a credit card logo 612, and a card type indicator 614.

The prepaid wireless access code 606 may provide a predetermined amount of wireless service. The predetermined amount of wireless service may include one or more or a combination of wireless services. The wireless services may include wireless airtime, wireless messaging, wireless data, days of service, or the like. The card 600 can have any number of the codes 606. For example, the card 600 may have two, three, four, five, six or more codes.

Accordingly, the transaction system and process described herein provides financial transactions based on a single card, the system and process further provides prepaid wireless service based on the single card, and the system and process further provides long-distance service based on the single card. The transaction system and process overcomes many the shortcomings of multiple card approaches.

The disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, and/or the like, and/or a combination of two or more thereof.

In an embodiment, the disclosure may be implemented in any type of mobile smartphones that are operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system or the like.

Further in accordance with various aspects of the disclosure, the methods described herein are intended for operation with dedicated hardware implementations including, but not limited to, microprocessors, PCs, PDAs, SIM cards, semiconductors, application specific integrated circuits (ASIC), programmable logic arrays, cloud computing devices, and other hardware devices constructed to implement the methods described herein.

The disclosure is not to be limited in scope by the specific embodiments described herein. Indeed, other various embodiments of and modifications to the disclosure, in addition to those described herein, will be apparent to those of ordinary skill in the art from the foregoing description and accompanying drawings. Thus, such other embodiments and modifications are intended to fall within the scope of the disclosure. Further, although the disclosure has been described herein in the context of at least one particular implementation in at least one particular environment for at least one particular purpose, those of ordinary skill in the art will recognize that its usefulness is not limited thereto and that the disclosure may be beneficially implemented in any number of environments for any number of purposes. Accordingly, the claims set forth below should be construed in view of the full breadth and spirit of the disclosure as described herein.

The invention claimed is:

1. A transaction system including one or more servers comprising:
   a communication module comprising a transceiver, a first computer processor, and an application programming interface (API) configured to establish a communication path with a financial institution, a prepaid wireless service provider, and a long distance telephone service provider via a communication network;
   a processing module comprising a second computer processor configured to access a database module, a prepaid wireless module, an account module, a long distance telephone service module, and a payment module to purchase or otherwise obtain products or services;
   the account module comprising a third computer processor and a first physical memory database to store account information of a user;
   the database module comprising a fourth computer processor and a second physical memory database to store transaction information of the user;
   the prepaid wireless module configured to communicate with the prepaid wireless service provider;
   the long-distance telephone service module configured to communicate with the long distance telephone service provider; and
   the payment module configured to determine transaction information for the purchase of products or services;
   wherein the transaction system is configured to:
      generate a debit card number and set up a debit account for the user with the financial institution;
      generate an access code for prepaid wireless service and set up a prepaid wireless service account for the user with the prepaid wireless service provider;
      generate a personal identification number for long distance telephone service and set up a long distance telephone service account for the user with the long distance telephone service provider;
      store debit account information, prepaid wireless service account information, and long distance telephone service account information of the user in the account module
      periodically receive updated account information of the user from the financial institution and store the updated account information in the account module;
      access information in the account module including the debit account information, the prepaid wireless service account information, and the long-distance telephone account information;
      generate a single card that includes each of the debit card number, the access code for prepaid wireless service, a long distance access number, and the personal identification number for long distance telephone service printed on the face of the card;
   wherein the processing module is further configured to access the payment module to obtain the debit account information associated with the debit card number printed on the face of the card, access transaction information stored at a point-of-sale terminal via the communication module, communicate with the financial institution in order to obtain authorization to complete one or more transactions to purchase products or services, authorize the one or more transactions when it is determined that the user is authorized to purchase the products or services, provide approval messages to the point-of-sale terminal to approve the one or more transactions, and record the one or more transactions in the database module;
   wherein the prepaid wireless module is further configured to communicate with the prepaid wireless service provider to add and authorize prepaid wireless service associated with the access code printed on the card and complete one or more transactions associated with the prepaid wireless service account of the user;
   wherein the long distance module is further configured to communicate with the long distance telephone service provider to obtain long distance telephone service associated with the long distance access number and personal identification number printed on the card and complete one or more transactions associated with the long distance telephone service account of the user.

2. A method for a user to execute debit card transactions, obtain prepaid wireless service, and obtain long distance telephone service using the information printed on a single card via a transaction system including one or more servers comprising a communication module, an application programming interface (API), a processing module, a prepaid wireless module, a long distance telephone service module, an account module, and a database module, the method comprising:
   generating, via the processing module, a debit card number and setting up a debit account for the user with a financial institution;
   generating, via the prepaid wireless module, an access code for prepaid wireless service and setting up a prepaid wireless service account for the user with a prepaid wireless service provider;
   generating, via the long distance telephone service module, a personal identification number for long distance telephone service and setting up a long distance telephone service account for the user with a long distance telephone service provider;
   storing debit account information, prepaid wireless service account information, and long distance telephone service account information of the user in the account module
   periodically receiving updated account information of the user from the financial institution and storing the updated account information in the account module;
   accessing information in the account module including the debit account information, the prepaid wireless service account information, and the long-distance telephone service account information;
   generating a single card that includes each of the debit card number, the access code for prepaid wireless service, a long distance access number, and the personal identification number for long distance telephone service printed on the face of the card;
   obtaining, via the processing module accessing the payment module, the debit account information associated with the debit card number printed on the face of the card, accessing transaction information stored at a point-of-sale terminal via the communication module, communicating with the financial institution in order to obtain authorization to complete one or more transactions to purchase products or services, authorizing the transactions when it is determined the user is authorized to purchase the products or services, providing approval messages to the point-of-sale terminal to approve the one or more transactions, and recording the one or more transactions in the database module;

communicating with the prepaid wireless service provider via the prepaid wireless module to add and authorize prepaid wireless service associated with the access code printed on the card and completing one or more transactions associated with the prepaid wireless service account of the user;

communicating with the long distance telephone service provider via the long distance telephone service module to obtain long distance telephone service associated with the long distance access number and personal identification number printed on the card and completing transactions one or more associated with the long distance telephone service account of the user.

\* \* \* \* \*